(12) United States Patent
Perdios (10) Patent No.: US 10,086,725 B2
(45) Date of Patent: Oct. 2, 2018

(54) ACCESSORY DEVICE FOR CHAIRS AND SEATS FOR SUPPORTING FOOT

(71) Applicant: Archimedes Perdios, New York, NY (US)

(72) Inventor: Archimedes Perdios, New York, NY (US)

(*) Notice: Subject to any disclaimer, the term of this patent is extended or adjusted under 35 U.S.C. 154(b) by 0 days.

(21) Appl. No.: 15/096,725

(22) Filed: Apr. 12, 2016

(65) Prior Publication Data

US 2016/0250951 A1 Sep. 1, 2016

(51) Int. Cl.
*B60N 2/44* (2006.01)
*B64D 11/06* (2006.01)
*B61D 33/00* (2006.01)
*B60N 2/24* (2006.01)

(52) U.S. Cl.
CPC .......... *B60N 2/4495* (2013.01); *B60N 2/242* (2013.01); *B61D 33/005* (2013.01); *B64D 11/0643* (2014.12)

(58) Field of Classification Search
CPC .. B60N 2/4495; B60N 2/242; B64D 11/0643; B61D 33/005
USPC .................................... 297/273, 274, 440.11
See application file for complete search history.

(56) References Cited

U.S. PATENT DOCUMENTS

| 402,130 | A | * | 4/1889 | Bedford | A47C 3/0255 248/328 |
| 472,351 | A | * | 4/1892 | Higham | A47C 3/0255 297/274 |
| 1,057,360 | A | * | 3/1913 | Patten | A47D 13/105 297/274 |
| 2,119,023 | A | * | 5/1938 | Pickard | B60N 2/5883 |
| 2,655,198 | A | * | 10/1953 | Williams | A47D 13/105 297/274 |
| 2,821,335 | A | * | 1/1958 | White | A01M 31/02 182/187 |
| 2,888,689 | A | * | 6/1959 | Mourot | A47C 4/42 248/167 |
| 4,101,165 | A | * | 7/1978 | Hammer | A47C 3/0255 297/273 |
| 6,019,194 | A | * | 2/2000 | Loomis, Sr. | A01M 31/02 182/187 |
| 6,142,567 | A | * | 11/2000 | Bentley | A47K 17/02 297/273 |
| 6,832,741 | B2 | * | 12/2004 | Jarosz | B60N 3/063 244/118.5 |

(Continued)

*Primary Examiner* — Anthony D Barfield
(74) *Attorney, Agent, or Firm* — Barry Choobin; Patent 360

(57) ABSTRACT

The embodiments herein provide a foot supporting apparatus/accessory device for chairs and seats. Each footrest comprises a base for supporting a foot and connected to a ring through a pair of strings passed through a pair of tubes. The ring is coupled to a hanging mechanism attached to clamp for attaching the foot rest to the back of seat at the front of a passenger in train/bus/airplane. The base is a fabric foldable to take a shape of the foot of the passenger in hanging condition. Several knots are provided at a plurality of locations along a length of the hanging mechanism. The clamp is engaged with a knot based on desired height to hang and hold the foot rest at a desired height to provide a desired leg space to enable the passenger to move the foot freely and at any degrees of freedom.

7 Claims, 7 Drawing Sheets

(56) References Cited

U.S. PATENT DOCUMENTS

| | | | | |
|---|---|---|---|---|
| 7,322,655 | B1 * | 1/2008 | Williams | A47C 7/52 297/423.15 |
| 7,448,688 | B2 * | 11/2008 | Farah | A47C 16/02 108/47 |
| 7,954,900 | B2 * | 6/2011 | Shantha | B60N 3/06 297/423.15 |
| 8,147,345 | B2 * | 4/2012 | Furman | A47D 13/02 297/273 |
| 8,191,913 | B1 * | 6/2012 | Jessome | A61G 5/12 280/250.1 |
| 8,864,237 | B2 * | 10/2014 | Long | B60N 3/06 297/423.15 |
| 8,905,483 | B2 * | 12/2014 | Block | B60N 3/004 297/423.15 |
| 2003/0214164 | A1 * | 11/2003 | Gervais | A47C 15/00 297/273 |
| 2007/0158992 | A1 * | 7/2007 | Dowty | B60N 2/62 297/423.19 |
| 2007/0246991 | A1 * | 10/2007 | Farah | A47C 16/02 297/423.39 |
| 2011/0089725 | A1 * | 4/2011 | Shantha | B60N 3/06 297/180.1 |
| 2013/0278039 | A1 * | 10/2013 | Long | B60N 3/06 297/423.15 |

* cited by examiner

ACCESSORY DEVICE FOR CHAIRS AND SEATS FOR SUPPORTING FOOT

BACKGROUND

Technical Field

The embodiments herein are generally related to foot rests. The embodiments herein are particularly related to an accessory device for supporting foot. The embodiments herein are more particularly related to an accessory device for attaching with chairs and seats for supporting and moving foot. The embodiments herein are especially related to an accessory device for supporting foot and capable of adjusting the vertical and horizontal movement of individual legs.

Description of the Related Art

Long travel by any means of transportation including airplanes, rail road, and bus are cumbersome due to many reasons. The reasons includes length of travel time, type of seats and seating posture, foot rest etc. Many times, passengers in airplane have to sit continuously for many hours which are uncomfortable. The types of seats and seating postures may cause pain at different parts of the body.

One of the common problems faced by the passenger during long travel is fatigue of foot. Conventionally, the footrest in airplanes, bus and railroad transportation is housed at the lower part of a front seat. The footrest is inclined to a position suitable for the passenger. However, the degree of freedom of movement for the footrest attached to the front seat, is highly restricted.

Due to the inconvenience, an improved design for a footrest capable of being adjusted in vertical and horizontal directions is a major concern. Many new designs of portable footrest are currently available in the market. The passenger is enabled to carry the portable footrest during long travel to improve the comfort level of the passenger. However, in most of the designs, the footrest provides a space to accommodate both legs of the passenger. The footrest is capable of being adjusted to a height for supporting both legs.

Hence, there is a need for a foot supporting apparatus for enabling individual adjustment of each leg. There is also a need for a foot supporting apparatus for enabling vertical and horizontal movements of the legs in all degrees of freedom. Further, there is a need for an adjustable, movable and portable foot supporting apparatus/accessory.

The above mentioned shortcomings, disadvantages and problems are addressed herein and which will be understood by reading and studying the following specification.

OBJECTS OF THE EMBODIMENTS

The primary object of the embodiments herein is to provide a foot supporting apparatus for providing support to foot and capable of adjusting a height of each leg to a desired position thereby improving a comfort level of the passenger.

Another object of the embodiments herein is to provide a foot supporting apparatus provided with a hanging mechanism capable of being folded and unfolded, thereby taking the shape of the foot of the passenger Yet another object of the embodiments herein is to provide a foot supporting apparatus with a string configured to adjust a height of the hanging support for holding the foot of the passenger to any desired height.

Yet another object of the embodiments herein is to provide a foot supporting apparatus facilitating vertical and horizontal movements of the foot, thereby allowing movement in different degrees of freedom.

Yet another object of the embodiments herein is to provide a light weight foot supporting apparatus that is removable portable and adjustable.

Yet another object of the embodiments herein is to provide a foot supporting apparatus with a clamping element holding the string at a desired point, thereby allowing movement of legs and improve circulation.

Yet another object of the embodiments herein is to provide a foot supporting apparatus comprising a clamping element attached to the back of a seat for supporting the hanging member.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the most detailed description that is presented later. The objects and advantages of the embodiments herein will become readily apparent from the following description taken in conjunction with the accompanying drawings.

The various embodiments herein provide a foot supporting apparatus comprising a pair of footrest for increasing a height to enhance a leg space area. Each footrest among the pair of footrest is designed/configured to support each leg and enables individual adjustment of each leg. The passenger is capable of adjusting the vertical and horizontal movements of each footrest to increase a comfort level of the passenger.

According to an embodiment herein, a foot supporting apparatus/accessory device is provided for chairs and seats for supporting a foot of the passenger. The device comprises a foot rest for holding and supporting a foot of a passenger. The foot rest comprises a base for supporting a foot of a passenger. The base comprises a fabric. The fabric is folded to take a shape of the foot of the passenger. A pair packets are provided in the base for receiving a pair of tubes. The pair of packets are provided respectively at two opposite edges of the base. The pair of tubes are configured to provide rigidity and strength to the base for supporting the foot. The pair of tubes comprises a first tube and a second tube stitched to a first side and a second side of the base. A pair of strings are passed through the first tube and the second tube. The pair of strings are configured to adjust a height of the footrest. The pair of strings are joined together and connected to a ring. A hanging mechanism is attached to the foot rest through the ring to hang the foot rest to provide a leg space for free movement of the foot rest. A plurality of knots are provided in the hanging mechanism at a plurality of locations to adjust a height of the foot rest. A clamping element is attached to the hanging mechanism to hold the foot rest at desired height position. The clamping element is attached to a back side of a seat arranged at a front side of the passenger.

According to an embodiment herein, the fabric comprises two layers of fabric cloth sewed together.

According to an embodiment herein, the base is suspended using the pair of tubes and pair of strings in the foot rest.

According to an embodiment herein, the first side of the fabric comprising the first tube is arranged mutually opposite to the second side of the fabric comprising the second tube.

According to an embodiment herein, the pair of string comprises a first string and a second string. The first string is passed through the first tube and a second string is passed through the second tube.

According to an embodiment herein, the clamping element is clamped to any one of the plurality of knots based on a desired height position to hold the foot rest at the desired height position.

According to an embodiment herein, the pair of tubes is made of materials selected from a group of materials consisting of aluminium, steel, wood, plastic.

According to an embodiment herein, the clamping element is a metal clip or hook.

According to an embodiment herein, the hanging mechanism is a rope or a string.

According to an embodiment herein, the device is portable. The device is foldable when the device is not in use.

According to an embodiment herein, a pair of footrest in a foot supporting apparatus for chairs and seats is disclosed. Each footrest comprises a hanging member/mechanism/element/support, a pair of tubes, a pair of strings, and a clamping element. The hanging support is configured for receiving a foot of the passenger. The hanging support comprises a fabric base foldable to take a shape of the foot of the passenger. The hanging support has packets for receiving a pair of tubes to suspend the hanging support. The pair of tubes comprises a first tube and a second tube inserted into the packets stitched to a first side and a second side of the fabric. A pair of strings are passed through the first tube and the second tube and configured to adjust a height of the footrest. The pair of strings are joined together and comprises a plurality of knots at different position. The clamping element is configured to hold the strings at a desired position. The clamping element is configured for attaching with a back side of a seat poisoned at the front.

According to an embodiment herein, the hanging support comprises two layers of fabric sewed together.

According to an embodiment herein, the hanging support is suspended using the pair of tubes and pair of strings.

According to an embodiment herein, the first tube and the second tube are arranged along the two opposite sides/edges of the fabric.

According to an embodiment herein, the pair of strings comprises a first string passing through the first tube and a second string passing through the second tube.

According to an embodiment herein, the plurality of knots provided at a plurality of positions along a length of the pair of strings to enable the passenger to adjust a height of the footrest.

According to an embodiment herein, the clamping element is configured for clamping/engaging with each knot among the plurality of knots to adjust the height of the footrest.

According to an embodiment herein, the pair of tubes is made of lightweight materials and wherein the lightweight material is aluminum.

According to an embodiment herein, the clamping element is a metal clip.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a foot supporting apparatus comprising a pair of footrest for increasing a height to enhance a leg space area. Each footrest among the pair of footrest is designed/configured to support each leg and enables individual adjustment of each leg. The passenger is capable of adjusting the vertical and horizontal movements of each footrest to increase a comfort level of the passenger.

According to an embodiment herein, a foot supporting apparatus/accessory device is provided for chairs and seats for supporting a foot of the passenger. The device comprises a foot rest for holding and supporting a foot of a passenger. The foot rest comprises a base for supporting a foot of a passenger. The base comprises a fabric. The fabric is folded to take a shape of the foot of the passenger. A pair packets are provided in the base for receiving a pair of tubes. The pair of packets are provided respectively at two opposite edges of the base. The pair of tubes are configured to provide rigidity and strength to the base for supporting the foot. The pair of tubes comprises a first tube and a second tube stitched to a first side and a second side of the base. A pair of strings are passed through the first tube and the second tube. The pair of strings are configured to adjust a height of the footrest. The pair of strings are joined together and connected to a ring. A hanging mechanism is attached to the foot rest through the ring to hang the foot rest to provide a leg space for free movement of the foot rest. A plurality of knots are provided in the hanging mechanism at a plurality of locations to adjust a height of the foot rest. A clamping element is attached to the hanging mechanism to hold the foot rest at desired height position. The clamping element is attached to a back side of a seat arranged at a front side of the passenger.

According to an embodiment herein, the fabric comprises two layers of fabric cloth sewed together.

According to an embodiment herein, the base is suspended using the pair of tubes and pair of strings in the foot rest.

According to an embodiment herein, the first side of the fabric comprising the first tube is arranged mutually opposite to the second side of the fabric comprising the second tube.

According to an embodiment herein, the pair of string comprises a first string and a second string. The first string is passed through the first tube and a second string is passed through the second tube.

According to an embodiment herein, the clamping element is clamped to any one of the plurality of knots based on a desired height position to hold the foot rest at the desired height position.

According to an embodiment herein, the pair of tubes is made of materials selected from a group of materials consisting of aluminium, steel, wood, plastic.

According to an embodiment herein, the clamping element is a metal clip or hook.

According to an embodiment herein, the hanging mechanism is a rope or a string.

According to an embodiment herein, the device is portable. The device is foldable when the device is not in use.

According to an embodiment herein, a pair of footrest in a foot supporting apparatus for chairs and seats is disclosed. Each footrest comprises a hanging member/mechanism/element/support, a pair of tubes, a pair of strings, and a clamping element. The hanging support is configured for receiving a foot of the passenger. The hanging support comprises a fabric base foldable to take a shape of the foot of the passenger. The hanging support has packets for receiving a pair of tubes to suspend the hanging support. The pair of tubes comprises a first tube and a second tube inserted into the packets stitched to a first side and a second side of the fabric. A pair of strings are passed through the first tube and the second tube and configured to adjust a height of the footrest. The pair of strings are joined together and comprises a plurality of knots at different position. The clamping element is configured to hold the strings at a desired position. The clamping element is configured for attaching with a back side of a seat poisoned at the front.

According to an embodiment herein, the hanging support comprises two layers of fabric sewed together.

According to an embodiment herein, the hanging support is suspended using the pair of tubes and pair of strings.

According to an embodiment herein, the first tube and the second tube are arranged along the two opposite sides/edges of the fabric.

According to an embodiment herein, the pair of strings comprises a first string passing through the first tube and a second string passing through the second tube.

According to an embodiment herein, the plurality of knots provided at a plurality of positions along a length of the pair of strings to enable the passenger to adjust a height of the footrest.

According to an embodiment herein, the clamping element is configured for clamping/enegaging with each knot among the plurality of knots to adjust the height of the footrest.

According to an embodiment herein, the pair of tubes is made of lightweight materials and wherein the lightweight material is aluminum.

According to an embodiment herein, the clamping element is a metal clip.

According to an embodiment herein, a pair of footrest in a foot supporting apparatus for chairs and seats is disclosed. Each footrest comprises a hanging member/mechanism/element/support, a pair of tubes, a pair of strings, and a clamping element. The hanging support is configured for receiving a foot of the passenger. The hanging support comprises a fabric base foldable to take a shape of the foot of the passenger. The hanging support has packets for receiving a pair of tubes to suspend the hanging support. The pair of tubes comprises a first tube and a second tube inserted into the packets stitched to a first side and a second side of the fabric. A pair of strings are passed through the first tube and the second tube and configured to adjust a height of the footrest. The pair of strings are joined together and comprises a plurality of knots at different position. The clamping element is configured to hold the strings at a desired position. The clamping element is configured for attaching with a back side of a seat poisoned at the front.

According to an embodiment herein, the hanging support comprises two layers of fabric sewed together.

According to an embodiment herein, the hanging support is suspended using the pair of tubes and pair of strings.

According to an embodiment herein, the first tube and the second tube are arranged along the two opposite sides/edges of the fabric.

According to an embodiment herein, the pair of strings comprises a first string passing through the first tube and a second string passing through the second tube.

According to an embodiment herein, the plurality of knots provided at a plurality of positions along a length of the pair of strings to enable the passenger to adjust a height of the footrest.

According to an embodiment herein, the clamping element is configured for clamping with each knot among the plurality of knots to adjust the height of the footrest.

According to an embodiment herein, the pair of tubes is made of lightweight materials and wherein the lightweight material is aluminum.

According to an embodiment herein, the clamping element is a metal clip.

The various embodiments herein provide a foot supporting apparatus comprising a pair of footrest for increasing the usage of leg space area. Each footrest among the pair of footrest supports each leg and enables individual adjustment of each leg. The passenger is capable of adjusting the vertical and horizontal movement of each footrest to increase the comfort level of the passenger.

Figure 1A:
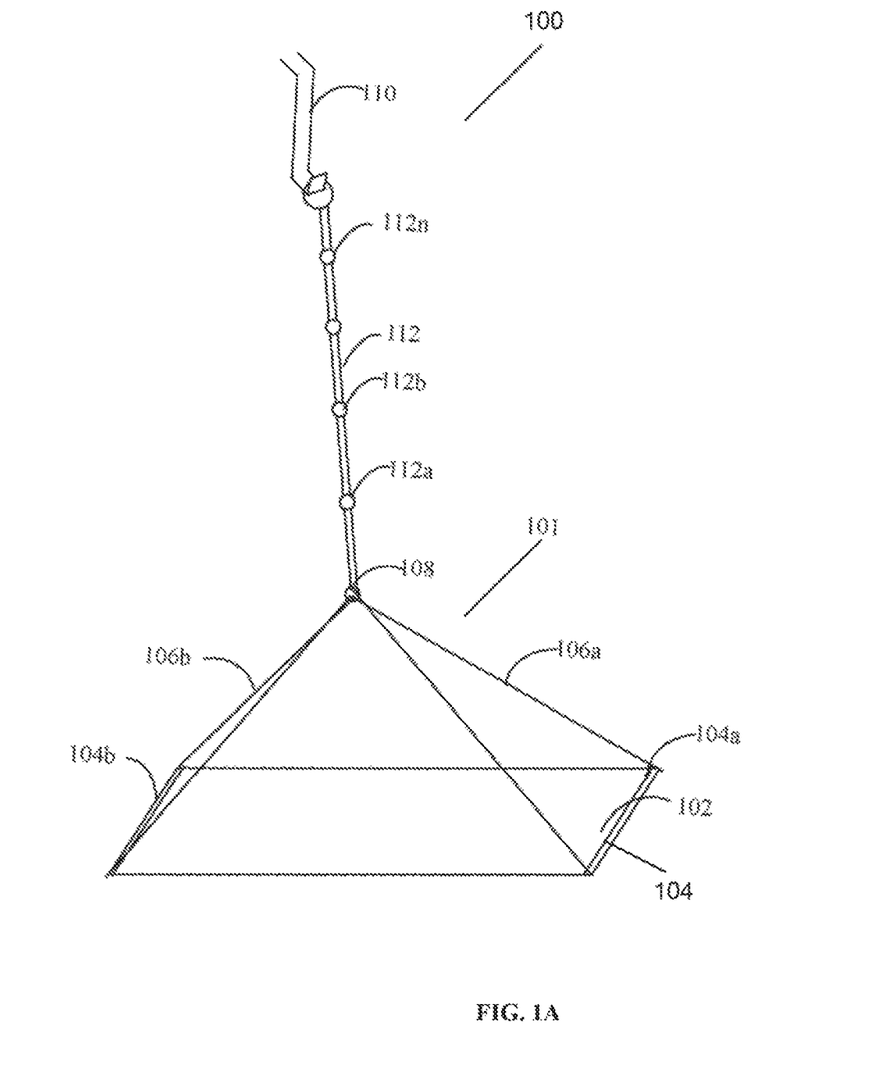
FIG. 1A illustrates a top side perspective view of a footrest in a foot supporting apparatus/accessory device for chairs and seats, according to one embodiment herein.

FIG. 1A illustrates a top side perspective view of a footrest in a foot supporting apparatus/accessory device for chairs and seats, according to one embodiment herein.

Figure 1B:
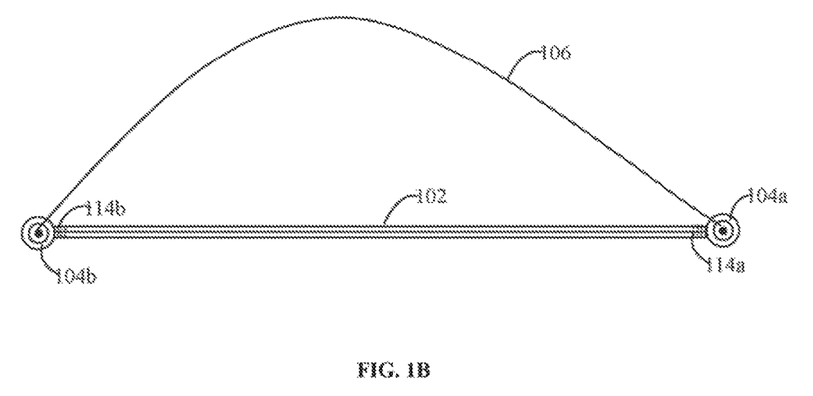
FIG. 1B illustrates a side view of a hanging mechanism and foot rest in a foot supporting apparatus/accessory device for chairs and seats, according to one embodiment herein.

FIG. 1B illustrates a side view of a hanging mechanism and foot rest in a foot supporting apparatus/accessory device for chairs and seats, according to one embodiment herein.

Figure 1C:
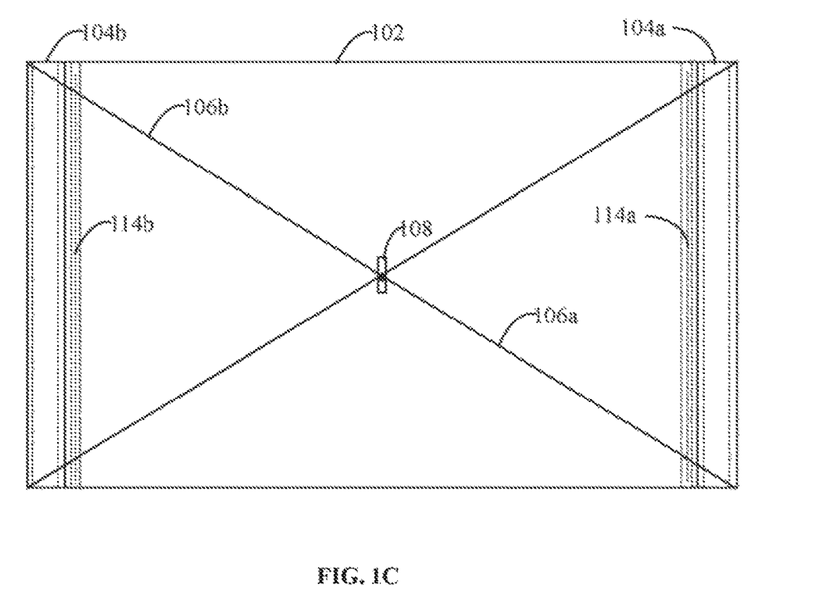
FIG. 1C illustrates a top side view of a foot rest in a foot supporting apparatus/accessory device for chairs and seats, according to one embodiment herein.
Figure 1D:
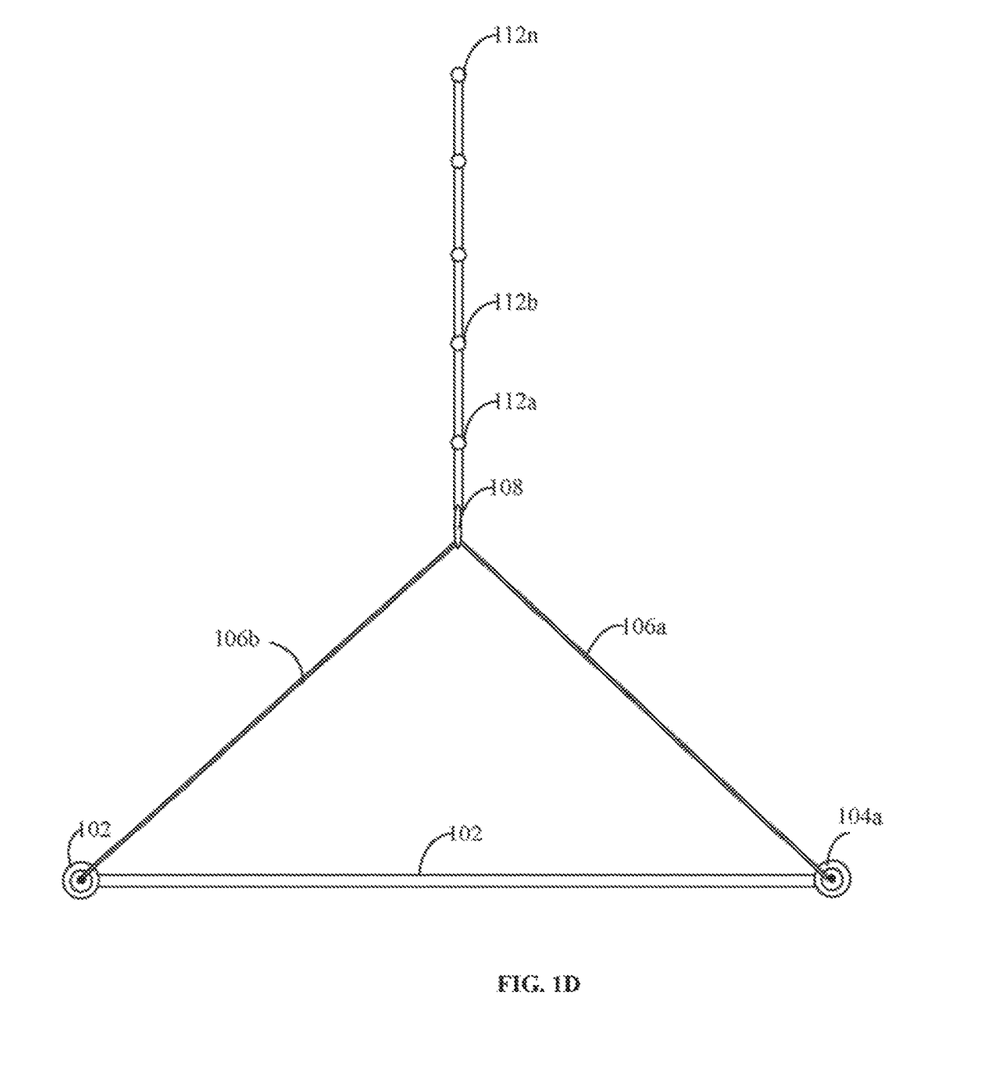
FIG. 1D illustrates a front side view of foot supporting apparatus/accessory device for chairs and seats, according to one embodiment herein.
Figure 1E:
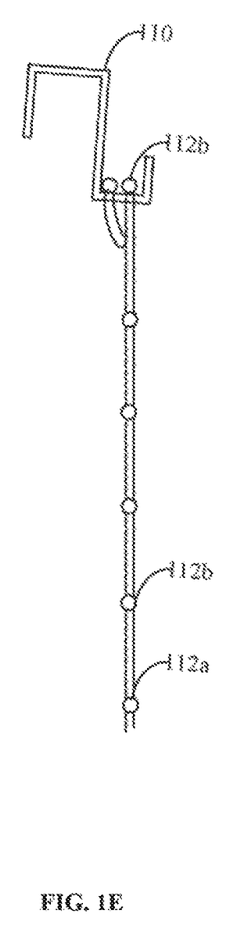
FIG. 1E illustrates a side view of an clamping element coupled to a hanging mechanism for hanging the footrest in a foot supporting apparatus/accessory device for chairs and seats, according to one embodiment herein.
Figure 1F:
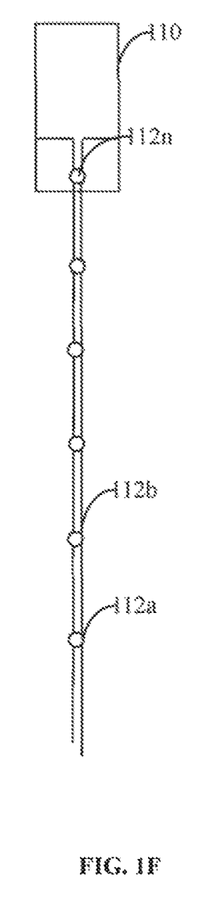
FIG. 1F illustrates a front view of an clamping element coupled to a hanging mechanism for hanging the footrest in a foot supporting apparatus/accessory device for chairs and seats, according to one embodiment herein.

FIG. 1C illustrates a top side view of a foot rest in a foot supporting apparatus/accessory device for chairs and seats, according to one embodiment herein. FIG. 1D illustrates a front side view of foot supporting apparatus/accessory device for chairs and seats, according to one embodiment herein. FIG. 1E illustrates a side view of a clamping element coupled to a hanging mechanism for hanging the footrest in a foot supporting apparatus/accessory device for chairs and seats, according to one embodiment herein. FIG. 1F illustrates a front view of a clamping element coupled to a hanging mechanism for hanging the footrest in a foot supporting apparatus/accessory device for chairs and seats, according to one embodiment herein.

FIG. 1A illustrates a schematic diagram of a footrest in a foot supporting apparatus, according to one embodiment herein. FIG. 1B illustrates a schematic diagram of a hanging member in a foot supporting apparatus, according to one embodiment herein. FIG. 1C illustrates a top view of a hanging member in a foot supporting apparatus, according to one embodiment herein. FIG. 1D illustrates a front view of a footrest in a foot supporting apparatus, according to one embodiment herein. FIG. 1E illustrates a side view of a clamping member for hanging the footrest, according to one embodiment herein. FIG. 1F illustrates a front view of a clamping member for hanging the footrest, according to one embodiment herein.

With respect of FIG. 1A-FIG. 1F, the foot supporting apparatus comprises a pair of foot rest 101 for supporting each leg of the passenger. Each footrest 101 is attached to the back of a front seat in a car/bus/airplane/train to enable individual movement of the legs through a clip 110 and hanging mechanism 112, thereby providing a desired leg space for each foot movement to make the travel more comfortable. Each footrest 101 is configured to increase a blood circulation and is capable of being adjusted individually based on the comfort level of the passenger. Each foot supporting apparatus comprises the footrest 101 attached to the hanging mechanism 112 through a pair of strings 106a, 106b, and a ring 108. Each foot rest 101, has the base 102 for supporting a foot. The base 102 is made of fabric or any flexible material. The base 102 is provided with a pair of packets 104 arranged along the opposite edges of the base 102. A pair of tubes comprising the first tube 104a and the second tube 104b, are received respectively in the pair of packets 104 to provide a rigid support base for holding the foot. The base 102 is attached to the hanging mechanism 112 such as a rope through a ring 108. The base 102 is coupled to the ring 108 through the pair of strings 106a, 106b. The hanging mechanism 112 is attached to the clamping element such as a clip or hook 110 for attaching the foot supporting device to the back of a seat provided in front of the passenger in the bus/car/airplane.

The footrest 101 is configured to receive and support the foot of the passenger. The base 102 is made of material including fabric. The base comprises two layers of fabric sewed together at a first point 114a and a second point 114b. The base 102 is light in weight and is capable of being adjusted or removed. The base 102 is capable of being folded and unfolded into different shapes. The base 102 is configured and designed to take the shape of the passenger's foot, when the foot rest 101 or the base 102 is suspended. The foot rest 101 allows the movement of the passenger's foot in any degree of freedom. The foot rest 101 is capable of being moved in the vertical and horizontal direction, thereby providing high level of comfort for the passenger.

The foot rest 101 comprises a pair of tubes 104a, 104b stitched to the two sides of the base 102. The pair of tubular structure comprises a first tube 104a and a second tube 104b. The first tube 104a and the second tube 104b are made of materials including but not limited to aluminum and steel. The first tube 104a and the second tube 104b are configured to provide a strength/rigidity to hold the leg of the passenger. The first tube 104a is stitched on to a first side of the base 102. The second tube 104b is stitched on to a second side of the base 102. The first side and the second side are arranged opposite to each other in the base 102.

A pair of strings comprises a first string 106a and a second string 106b. The first string 106a passes through the first tube 104a and the second string 106b passes through the second tube 104b. The first string 106a and the second string 106b are tied to a ring 108. The ring is coupled to the hanging mechanism such a rope 112 and the hanging mechanism 112 is connected to a clamping element such as a clamp or clip or hook 110 for attaching the foot rest to the seat at the front to enable a hanging of the footrest 101. The hanging mechanism comprises a plurality of knots 112a, 112b ... 112n provided/arranged at a plurality of locations/positions along the length of the hanging mechanism/string 102. The clamping element/clamp 110 includes metal clips that are placed on the back of the front seat. According to an embodiment herein, the clamping element/clamp 110 is attached to the back of the tray table of the front seat. The hanging mechanism/string 112 is attached to the clamping element/clamp/clip 110 using each knot. The passenger is enabled to adjust the length of the hanging mechanism/string 112 by clamping the desired position of the string with the clamping element/clamp 110. The passenger is enabled to engage a last knot 112n with the clamping element/clamp/clip 110 to keep the leg down on the floor. Further, the passenger is enabled to lift the hanging mechanism/string 112 to engage the clamping element/clamp 110 with remaining knots, to suspend the passenger's leg at different height. The passenger engages the first knot 112a with the clamping element/clamp 110 to raise the leg to a maximum height.

Therefore, the passenger is enabled to adjust each footrest among the pair of footrest in the same manner. The passenger adjusts the vertical and horizontal movement of the each foot rest depending on the comfort level of the passenger.

Figure 2:
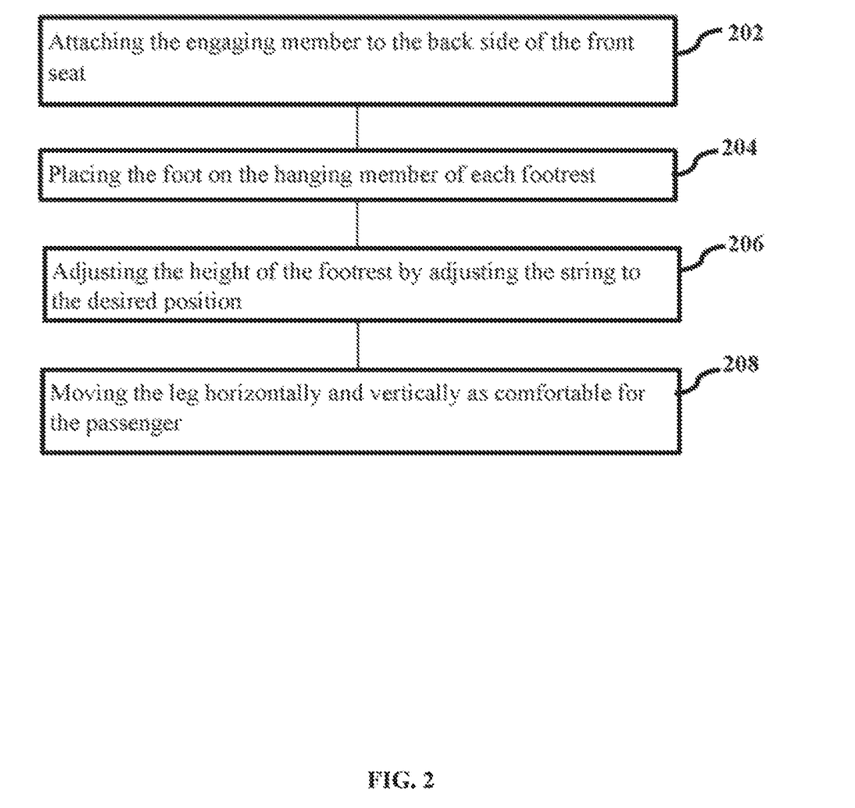
FIG. 2 illustrates a flow chart explaining a method of operating the foot supporting apparatus/accessory device for chairs and seats, according to one embodiment herein.

FIG. 2 illustrates a flow chart explaining a method of operating the foot supporting apparatus/accessory device for chairs and seats, according to one embodiment herein. With respect to FIG. 2, the method includes attaching a clamping element at the back of the front seat (202). The clamping element is also permanently attached to the back of seats in an airplane, a bus and a train. According to an embodiment herein, the clamping element is attached to the tray table at the back of seats.

The passenger places the passenger's foot on each footrest in the foot supporting apparatus (204). The passenger places the foot on a base in the footrest. Further, the passenger lifts the base by pulling the string that passes through the first and second tubes stitched on to the base. The base is made of fabrics. Therefore, the base is configured to take the shape of the foot of the passenger, when the passenger lifts the base.

Further, the passenger adjusts the height of the footrest based on the comfort level of the passenger by adjusting the string to a desired position (206). The string that holds the base with the foot comprises a plurality of knots. The passenger is capable of clamping a knot among the plurality of knots to adjust the height of the footrest. Once each of the footrest is adjusted to a particular height, the passenger is capable of moving the leg in horizontal and vertical directions as comfortable for the passenger (208).

Therefore, the foot supporting apparatus enables a passenger to move each leg independently in all direction according to the comfort of the passenger. The foot supporting apparatus is movable and is adjusted to any desired position. The footrest is configured to increase the blood circulation and thereby reduces foot fatigue. The footrest comprises mechanism for folding and unfolding the footrest. Further, the footrest is light in weight, removable and portable. The foot supporting apparatus is capable of being used by any individual and does not require any training.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A foot supporting apparatus, said foot supporting apparatus comprising:
    a footrest for holding and supporting a foot of a passenger, said footrest comprising:
        a base for supporting the foot of the passenger, said base made of a fabric material;
        a pair of packets, each of said packets incorporated at two opposite edges of the base respectively, each of said packets configured to receive a first tube and a second tube respectively, and wherein each of said packets are stitched onto said opposite edges of the base;
        a pair of strings passed through the first tube and the second tube respectively, and wherein the pair of strings are configured to adjust a height of the footrest, and wherein the pair of strings are joined together and connected to a ring;
        a hanging mechanism attached to the footrest through the ring to hang the footrest to provide for free movement of the footrest, and wherein a plurality of knots are provided in the hanging mechanism at a plurality of predetermined locations to adjust a height of the footrest; and
        a clamping element attached to the hanging mechanism to hold the footrest at a desired height position, and wherein the clamping element is attached to a back side of a seat located in front of the passenger.

2. The device according to claim 1, wherein the base is suspended using the pair of tubes and pair of strings.

3. The device according to claim 1, wherein the clamping element is clamped to one of the plurality of knots based on the desired height position of the footrest.

4. The device according to claim 1, wherein the pair of tubes is constructed using materials selected from a group consisting of aluminium, steel, wood and plastic.

5. The device according to claim 1, wherein the clamping element is selected from a group consisting of a metal clip and a hook.

6. The device according to claim 1, wherein the hanging mechanism is a rope.

7. The device according to claim 1, wherein the device is portable and wherein the device is foldable when not in use.

* * * * *